US012226888B2

(12) United States Patent
Tracy

(10) Patent No.: US 12,226,888 B2
(45) Date of Patent: Feb. 18, 2025

(54) CONSTRUCTION LAYOUT TOOLS AND METHODS

(71) Applicant: Eric Lee Tracy, Fort Collins, CO (US)

(72) Inventor: Eric Lee Tracy, Fort Collins, CO (US)

( * ) Notice: Subject to any disclaimer, the term of this patent is extended or adjusted under 35 U.S.C. 154(b) by 57 days.

(21) Appl. No.: 17/989,538

(22) Filed: Nov. 17, 2022

(65) Prior Publication Data

US 2023/0150105 A1 May 18, 2023

Related U.S. Application Data

(60) Provisional application No. 63/280,879, filed on Nov. 18, 2021.

(51) Int. Cl.
*B25F 5/02* (2006.01)

(52) U.S. Cl.
CPC ..................................... *B25F 5/02* (2013.01)

(58) Field of Classification Search
CPC ......................................................... B25F 5/02
See application file for complete search history.

(56) References Cited

U.S. PATENT DOCUMENTS 6,469,615 B1 * 10/2002 Kady ....................... G05B 9/02 340/5.1
6,738,628 B1 * 5/2004 McCall ..................... G01S 1/68 340/8.1
9,004,191 B2 * 4/2015 Muller .................... B25F 5/006 174/544
9,756,402 B2 * 9/2017 Stampfl .................. B23Q 17/00
2003/0043016 A1 * 3/2003 Kady ....................... G07C 9/33 340/5.1
2003/0069648 A1 * 4/2003 Douglas ............. G05B 23/0272 340/568.1
2005/0247460 A1 * 11/2005 Luebke ............. H01L 21/76829 173/2
2014/0240125 A1 * 8/2014 Burch ...................... B25H 3/02 340/539.13
2014/0259599 A1 * 9/2014 Glaspell .................. B25B 21/00 29/407.04
2016/0311094 A1 * 10/2016 Mergener .............. B25B 21/008
2016/0342151 A1 * 11/2016 Dey, IV .............. G06F 3/04842
2017/0173768 A1 * 6/2017 Dey, IV .................. B25B 21/02
2017/0266868 A1 * 9/2017 Ralston .................... G01D 7/00

OTHER PUBLICATIONS https://handheldinkjetprinter.us/touchjet-one-handheld-inkjet-printer.html.
https://www.engineersupply.com/Leica-Disto-E7500i-Laser-Distance-Meter.aspx.
https://en.wikipedia.org/wiki/Stud_finder.

* cited by examiner

*Primary Examiner* — Lucas E. A. Palmer
(74) *Attorney, Agent, or Firm* — Wiedmann Law LLC

(57) ABSTRACT

In certain embodiments, inventive apparatus may feature, inter alia, parameter measurement componentry configured to generate parameter measurements of a reference building component (e.g., many real-time measurements along, e.g., the SE wall bottom plate); comparison componentry configured to compare real-time parameter measurements with such digital construction action location information to generate comparison information; and sense-able construction action location indicator generation componentry that generates sense-able construction action location indicator(s) based on the comparison information based on the comparison information.

25 Claims, 6 Drawing Sheets

CONSTRUCTION LAYOUT TOOLS AND METHODS

CROSS REFERENCE TO RELATED APPLICATION

This U.S. Non-Provisional patent application claims priority to U.S. provisional application No. 63/280,879, filed Nov. 18, 2021, said provisional application incorporated herein in its entirety.

BACKGROUND OF INVENTION

Construction projects in the residential, commercial and other construction industries typically involve a detailed set of construction plans prepared using a computer aided design software program or other architectural or design software, apps or other means of design. Those plans are typically printed in hard copy and the construction professional uses the set of plans in the construction field to manually measure, mark, cut and construct the project per the set of plans and to meet building code requirements. Although the construction plans show the general concept of the project, the construction professional has to read and interpret the plan, and mentally or manually calculate and/or transcribe the majority of the details needed to construct the actual plan.

Manual tape measurers, pencils, markers, squares, levels, etc., are typical tools used to layout materials in the building process. While templates, jigs and other physical aids have been used to make the construction process more efficient, there remains a constant need to refer to the construction plans, and make adjustments for non-typical layouts such as window or door locations, nail stud locations for perpendicular walls, etc. These adjustments and additions require a higher level of expertise and knowledge of the building process. King stud placement, jack stud or trimmer lengths and placement, header widths and type, sill lengths and vertical placement and cripple stud placement and lengths, etc., are usually detailed in a "typical" format in the plans, if at all, and the construction professional lays out and constructs these components to fit in the field. Floor joist and truss spacing is crucial and can vary throughout the project, thus requiring constant reference to the set of plans. Placement of other components such as those relating to, e.g., electrical, HVAC, plumbing, etc., are usually field-fit and may not be the most efficient layout to save labor, and materials, and require a higher level of experience from the laborers (generally, any construction worker, tool user, employer of the inventive technology, component installer, builder, planner, etc.) Cutting the non-standard lengths of material for trimmers, headers, sills, cripples, etc. requires time and thought on the size of opening and standard layout to mathematically calculate the actual length to cut. After the manual calculation, a length is determined, measured, manually marked, squared and then cut.

Constructing to meet all the requirements of the building codes also requires a higher level of experience and knowledge as that level of detail may not be included in the construction plan set. A typical note of "must meet building codes" is usually included on a set of plans, thus putting the burden of all the building code requirements on the builder or construction professionals. The local building inspector must verify all the codes are met. An example of this would be the type, size and spacing required for certain fasteners like nails, staples or screws, requirements for adhesives, shear wall requirements, etc. Of course, this conventional building approach can require a significant amount of time and expertise, and be very prone to human error. Embodiments of the inventive technology may seek to resolve some or all of such issues, at least to a degree, by improving construction efficiencies (e.g., increase construction speed, decrease material use) and accuracies.

BRIEF SUMMARY OF THE INVENTION

In certain embodiments, inventive apparatus may feature, inter alia, parameter measurement componentry configured to generate parameter measurements of a reference building component (e.g., many real-time measurements along, e.g., a SE (southeast) wall bottom plate of a $1^{st}$ floor of a specific construction project); comparison componentry configured to compare real-time parameter measurements with digital construction action location information to generate comparison information; and sense-able construction action location indicator generation componentry that generates sense-able construction action location indicator(s) based on the comparison information. Additional aspects of the inventive technology may feature a stop block apparatus that automatically repositions a stop block that is translationally movable along a guide to a position corresponding to a desired cut length, thereby facilitating cutting of a component into piece(s) of a desired length.

Use of the inventive technology, in certain of its various embodiments, could reduce the manual interpretation and execution of the construction plans and help make these construction processes more efficient and improve overall quality. Less experience could be required for the laborers, which could allow for more job opportunities and cheaper labor costs to help minimize the cost of construction and improve housing affordability while possibly also improving quality via, e.g., a reduction in construction error rates. Further, embodiments of the inventive technology can help to achieve marking components that are completed in real-time to avoid duplication of efforts between laborers. Certain advantages of the inventive technology may be particularly evident when used in the field, on the job-site or mass production. Indeed, objects of the inventive technology, in its various embodiments, may include improving efficiency, reducing cost, and improving accuracy of construction in the field or in mass production.

DETAILED DESCRIPTION OF THE. INVENTION

The present invention may manifest in several embodiments and may exhibit different inventive facets. The description provided herein, while sufficiently enabling, may only explicitly describe certain of the several embodiments. Aspects of the invention described herein can potentially be combined in various ways to create additional embodiments not explicitly described herein. Embodiments described herein may be exemplary only; they should not be read to limit the scope of the invention. Additionally, it should be understood that this application describes not only the multi-element apparatus and processes explicitly described, but also those involving any of the possible various combinations and permutations of such elements.

Construction plans prepared in any digital format digitally define the project. Lengths, heights, material specifications, code requirements, opening locations and sizes, material spacing, etc. are known data for a construction project. This information and any other pertinent information, generally, construction layout information, may include digital construction action location information such as, e.g., stud installation locations (i.e., stud locations), material cut lengths or locations, anchor bolt locations, installed component spacing, plumbing drain locations, locations of cuts, nail protectors, electric outlet, light fixtures, HVAC components, location for the circuitry required at switches, as but a few of the many different possible locations of construction actions performed during construction. Certain embodiments may feature digital construction layout information generation software configured to generate construction layout information (e.g., distance between studs, component type and size, etc.), perhaps based on digitized construction plans, and/or the ability to generate the digital construction plan(s) (featuring built-in design software instead of importing from other software). In certain embodiments, information, e.g., construction action location information (e.g., component installation location information), can be communicated to a tool (which may form part of and/or include part of a computer) from an electronic device (e.g., cell phone or other computer).

Figure 3:
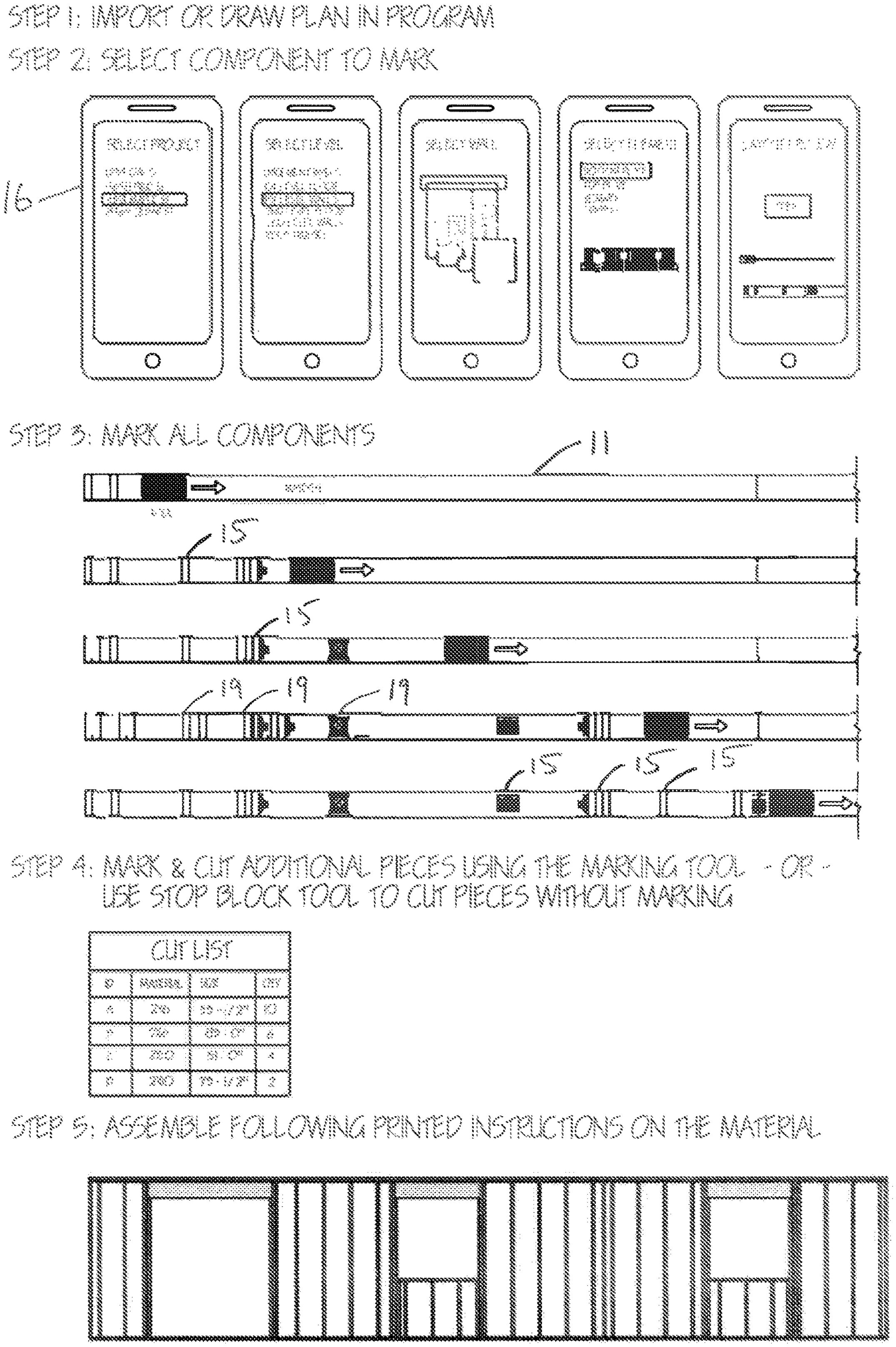
FIG. 3 shows 5 steps that may be featured in certain embodiments of the inventive technology. Step 3 shows snapshots in time of marking of a bottom plate, and step 4 involves the cutting of studs (additional pieces) to be placed on the bottom plate, to build the wall frame shown in step 5.

The tool, perhaps upon being moved along a reference component (e.g., an installed bottom plate, an uninstalled 2×4, etc.) can then use such information (e.g., regarding stud locations on such bottom plate, cut locations on such 2×4, etc.) to generate a sense-able construction action location indicator (15) such as a mark to indicate locations of various construction actions (e.g., installations of studs on the bottom plate, cross-cuts, etc.) on the reference component. Step 3 of FIG. 3 shows an example of such use. A laborer could then use such mark to properly place for installation, and then install (using in such case, fasteners such as nails) the studs, or to cut the 2×4 (as but two of many examples). Such is how at least one embodiment of the inventive technology may achieve its construction efficiency improvements. What may help to achieve such improvements in certain embodiments may be componentry that, in effect, transforms real-time measurements and construction action location information into a construction action location indicator(s) (15) (e.g., a visual indicator (19), e.g., straight line or other marking, on a reference component, or lighting (26), noise, etc. that increases in intensity, number, etc.), upon the tool's establishment at a position corresponding to the correct location of the construction action).

Embodiments of the inventive technology can be used to indicate (via a sense-able construction action location indicator (15)) any location of any construction action (e.g., installation of component such as support member or fastener, material cut, creation of rough opening, installation of stub out, installation of electrical outlet, joining of materials/component pieces to complete the length of the component to be installed, running wire at a certain location(s), installation of ducting at a certain location(s), performing a cut, notch or drill operation at certain location(s), installation of screws, nails or anchors at certain location(s), installation of studs, installation of trimmers, installation of cripples, installation of floor joists, installation of trusses, installation of shear wall locations, installation of plumbing drain, installation of nail protectors, installation of electrical components, installation of light fixtures, installation of HVAC components, installation of walls, installation of floor joists, installation of studs, installation of anchor bolts, installation of sill plates, installation of fireblocks, installation of wall components, installation of roof components, installation of trusses, installation of structural components, etc.) An installation location of any component can be expressed as construction action location information (e.g., digital information), and may regard a location of a building construction action relative to a reference building component (11) (e.g., install left side of stud on pre-installation or installed sill plate (reference component) at 16" from neighboring stud; install anchor bolt every 3' on sill plate (reference component); install plumbing stub out 12' from NW corner along W concrete foundation wall (reference component); install 2×6 joist at 2' spacing on top plate (reference component); cut 2×4 board (reference component) at 8' to create properly sized stud for installation; cut 12' 2×6 board to create 4, 3' headers, etc.) Note that even the termination of a building component (e.g., the end of a wall, or end of a stud) is considered a construction action location, as such will, at installation, reflect at least a part of the complete set of location information regarding that component.

As should be understood, the term "reference component" as used herein indicates the component, e.g., board, wall, column, corner, benchmarks, etc., relative to which a construction action is to be performed. The reference component may be a component that, when a measurement is taken relative to it (e.g., along it, from one end), such measurement can be used to determine the precise location of the construction action (e.g., installation of a stud onto that reference component). Often, but not always, such reference component is an already installed component (or component of a partially fabricated part of building, such as a wall with studs, to be raised on its base to be installed in final installation position), but it may instead be an uninstalled component (e.g., an uninstalled board to be cut to a specific length, or cut into several components of same or different length, or to be marked with locations of bolts or studs before installation).

As indicated, several steps of the inventive technology (e.g., construction layout apparatus or stop block apparatus) may be computer implemented, which implies the functional use of a computer to at least some extent in performing the step, where a computer is generally defined as a processor(s) or a device including a processor(s), a MCU, electronics platform, CPU, circuit board, or other. A computer may also include, e.g., software, hardware, firmware, programming, code, permanent software programmed into a read-only memory, comparator, voice recognition software (e.g., Siri or Alexa, as but two examples), website, and/or app, inter alia. A computer can be in one site (e.g., in a handheld layout tool), or distributed over different sites (e.g., handheld layout tool and cellphone, or tool and cloud, tool and server, etc.), where the computing componentry in such different sites is capable of communicating with each other (and do so either in one way or multi-way). As such, and by example only, where an electronic device (16) such as, e.g., a cell phone, is in communication, whether wirelessly or otherwise, with a processor established in a handheld tool (5) (see, e.g., FIG. 1A), not only may the processor of the tool be termed a computer, but also, the cell phone may be referred to as a computer, and the cellphone and processor of the tool together may be referred to as a computer. A computer often includes componentry that enables digital communication (e.g., share data, instructions, a keypad for manual data entry, voice recognition software, etc.) A computer may generate or assist in the generation of the initial digital layout information and/or automate the processes performed during operation of the inventive technology. Just as certain steps may be computer implemented, certain componentry may be computerized.

Of course, in any of the apparatus disclosed herein (e.g., construction layout apparatus, stop block (36) apparatus, etc.), a power supply (40), e.g., battery, corded, solar, etc., may be incorporated to power componentry, e.g., a computer, sense-able construction action location indicator generation componentry (14), and electro-mechanical linear translator (33) (described in more detail below), laser or roller measurement componentry, optical sensor distance measurement componentry, spatial referencing distance measurement componentry (e.g., Lidar, sonar, photogrammetry, etc.), etc. Indeed, a power supply may power any power consuming componentry).

In certain embodiments, a processor may be instructed to act on information (e.g., compare two pieces of data, e.g., first data such as parameter measurement (e.g., distance/length measurement) on a reference building component (11) (e.g., length measured in real-time perhaps by an apparatus such as a construction layout tool (5)) with second data such as construction action location information regarding the location of a building construction action(s) on the reference building component (11) (e.g., 16" from a certain end of the reference building component (11))). A result of such comparison, as described in more detail below, can be used to determine at what location a construction layout tool (5) should generate a sense-able construction action location indicator (15) on a reference component.

Digital construction action location information can be saved in any type of memory format before its communication to an apparatus such as a construction layout tool (5), communicated real time, or perhaps entered directly into such tool after which, in certain embodiments, it may then perhaps be saved on such apparatus. Many aspects of certain embodiments of the inventive technology may employ known functionalities (e.g., digital communication, saving of data in memory, and conversion of a rolled distance or laser shot distance into a digital length measurement) and known componentry (e.g., digital communication componentry (9), digital memory, laser distance measurement device, spatial referencing componentry (e.g., Lidar, sonar, etc.) and/or wheel/roller distance measurement device, etc.)

Figure 1C:
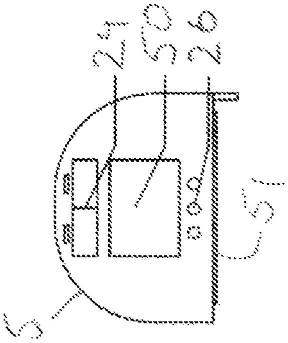
FIG. 1A shows an electronic device (here, a cell phone) in communication with a handheld construction layout tool (bottom view) as may appear in certain embodiments of the inventive technology.
FIG. 1B shows a side view of a handheld construction layout tool as may appear in certain embodiments of the inventive technology.
FIG. 1 C shows a front view of a handheld construction layout tool as may appear in certain embodiments of the inventive technology.
Figure 1B:
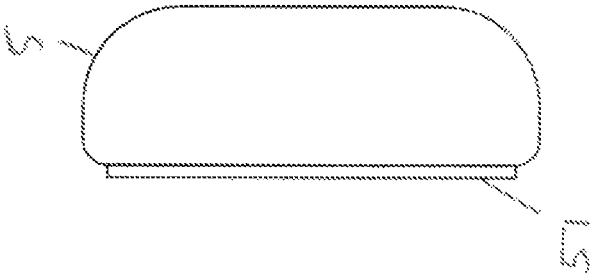
Figure 1A:
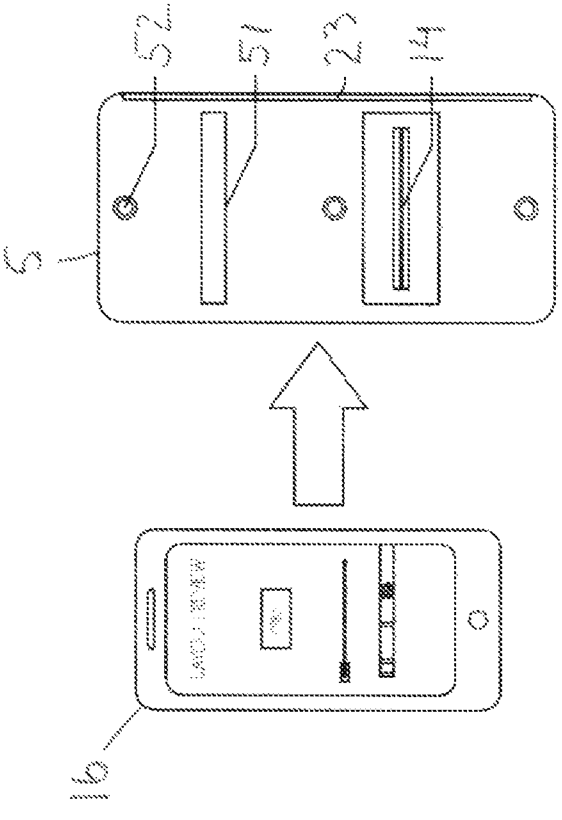

In certain embodiments of the inventive technology, achievement of construction efficiencies may involve communication of digital construction action location information regarding a location of a construction action (relative to a reference building component (11)) to an apparatus such as a construction layout tool (5) through use of digital communication componentry (9). Such digital communication may be wireless or wired. It can occur over significant distances (e.g., an architect's office in a city to a building site hundreds or thousands of miles away), or smaller distances (e.g., a few inches or such). It can occur between two or more discrete devices (one of which may be an apparatus such as a handheld construction layout tool (5)) (see FIG. 1A showing communication from a cell phone to a handheld tool). Digital communication can involve use of a memory device (e.g., a memory device such as a thumb or other drive that is interfaced with the tool). Digital communication may even involve entry of such information, by a laborer, directly onto the tool, (e.g., via keypad, on-screen touch selection, voice recognition, etc.) and electronic conveyance of such information within the apparatus to another component of the apparatus, e.g., memory, a processor, etc. Communication componentry (9) includes even componentry that is configured to accept data (although typically such accepted data is then forwarded to componentry configured to act on it in some manner). In keeping with the broad understanding of the term componentry (as including one or more components), communication componentry (9) (e.g., configured to communicate digital construction action location information regarding a location of a building construction action relative to a reference building component (11)) is deemed to exist even where at least part of the communication functionality is achieved in a different device (e.g., in embodiments where data is communicated from a first device such as a cell phone to a discrete handheld construction layout tool (5), that tool may be said to include communication componentry (9)).

The inventive technology may include a method that may be employed by an apparatus; such apparatus may, by itself, be inventive. Certain embodiments of the inventive construction layout apparatus (4) may feature an e.g., a handheld tool such as a construction layout tool (5), (see, e.g., FIGS. 1A-C and 2A-C) that utilizes digital data from or based on a digitized construction plan, perhaps even also incorporating known building code requirements and any other applicable information (e.g., installation instructions), measures (e.g., in real-time) a parameter on a reference building component (11) (e.g., a bottom plate), compares such measurements to digital data, and generates an indicator (that is sense-able by a human or even automated machine, such as a "smart" saw that is configured to cut on a line) at a proper location for a construction action to take place on such reference component (e.g., stud installation on that bottom plate) (see, e.g., step 3 of FIG. 3). In such manner, the inventive technology can help to layout, via, e.g., marking (a type of sense-able indicator), construction components such as those required for building assembly, whether such building be a complete building, a portion thereof, a remodel, any construction project regardless of size, etc.

Such apparatus, which may manifest, at least in part, as a construction layout tool (5), may, in certain embodiments, be described as including communication componentry (9) configured to communicate digital construction action location information regarding a location of a building construction action relative to a reference building component (11); parameter measurement componentry (10) configured to generate parameter measurements of the reference building component (11); comparison componentry (13) configured to compare the parameter measurements with the digital construction action location information regarding the location of the building construction action to generate comparison information (e.g., calculated difference data, an instruction to generate an indicator, etc.); and sense-able construction action location indicator generation componentry (14) configured to generate at least one sense-able construction action location indicator (15) based on the comparison information. Note that a handheld construction layout tool (5) may be such apparatus, or may form a part of such apparatus (e.g., as where certain componentry, e.g., comparison componentry (13), is established in a device that is discrete from, but in communication with, such tool). That handheld tool may be in correct position (a position corresponding to the location of the building construction action) when, from such correct position, the sense-able construction action location indicator (15) (issued by the sense-able construction action location indicator generation componentry (14) of the handheld tool) is placed in the correct location (e.g., a marked line indicates the precisely correct location for a cut). Note that, when the handheld tool is in a position corresponding to the location of a construction action, the distance of the closest part of the handheld tool to a zero point may be different from the distance of the sense-able construction action location indicator to that zero point issued by the tool. A zero point may generally include any reference point, line, etc., perhaps from which a measurement is made. Additional, perhaps optional, features of the apparatus may, e.g., appear on a handheld tool, such as sensor(s) (52) (e.g., on bottom of tool, for distance measuring), an edge guide (23), manual controls (24) (e.g., on/off switch), display (50), lighting (26) (e.g., LED lights), speaker (27), microphone (90) (for voice recognition), etc.

In certain embodiments of the inventive technology, a handheld construction layout tool (5) may have the ability to perform, or at least play a role in performing, certain steps of the methods indicated herein. For example, certain embodiments of the apparatus generate parameter measurements of the reference component: if the task is to indicate the proper location of studs (e.g., west edges of correctly installed studs are at 14", 30", 46", etc. along a bottom plate (the "reference component")), then the parameter measurements on the reference building component (11) is a measured length along that bottom plate. In those embodiments featuring a handheld construction layout tool (5), such tool may achieve such parameter measurement.

In certain embodiments, and as discussed in more detail below, where the layout tool uses rollers, laser, spatial referencing system, etc., to measure distance, a series of measurements (perhaps many, even thousands, or even innumerable) may be taken (from a zero or other reference point) as the apparatus is moved along the reference component, away from or towards the zero (or other reference) point, perhaps with some or even each being compared (e.g., by a processor or other comparison componentry (13), typically computer componentry) to the construction action location information regarding a location of a building construction action relative to the reference building component (11) (e.g., 1.75 m from stud #4A (whose one side may serve as the reference (e.g., zero) point) upon communication of such data to it. Note that a zero point may be, e.g., at a beam interrupter (21) (anything that interrupts a laser beam, e.g., installed component, or intentionally placed "dummy" object) when the laser (22) emits from the tool as it is so moved, or at a laser emission point when the laser (22) emits from a stationary laser (and a part of the handheld tool acts as the beam interrupter). Such comparison(s) may yield comparison information, e.g., a real-time difference(s) between the two, instruction to generate a sense-able indicator, etc. Often there may be repeated real-time comparisons, of repeatedly changing, real-time parameter measurements during measurement of the parameter using construction layout tool (5) as it is moved along the reference building component (11). The sense-able construction action location indicator generation componentry (14) may generate a sense-able location indicator (15) based on comparison information, e.g., when the difference between the two compared data is acceptably small, the sense-able construction action location indicator generation componentry (14) may be instructed to generate a sense-able construction action location indicator (15) (briefly, sense-able location indicator).

In certain embodiments, sense-able construction action location indicators (15) on material may be used to indicate the correct location(s) of a building construction action, e.g., installation of a building component(s). Before a component (e.g., stud, as but one example) is installed, the inventive technology, in particular embodiments, can be used to mark a location on a reference component (e.g., bottom plate to which the stud is to be affixed) via a mark at that location. Such marking, or more generally, a sense-able construction action location indicator (15) (indicator capable of being sensed by a human, whether via sight, hearing, and/or touch) may be of the form appropriate for the construction action to be performed at the marked location (e.g., a line for a cut, perhaps a line for placement of a side of a component during installation of the component, a dot, cross-mark, or circle for a fastener install or hole drilling, a dot, cross-mark, or circle for a stub out, as but a few examples). That marking can be generated (created and placed/rendered) at any site on that that reference component sufficient to be recognized by the laborer and used by the laborer to properly (in correct location and orientation) perform the intended construction action (e.g., install a component) on the reference component.

Examples of generation of such sense-able location indicator(s) (15) include but are not limited to, e.g., marking with ink, graphite, coloring, paint, material burn (e.g., a straight burn line), laser engraving, textual stamping, surface roughness and/or generating noises (e.g., voice, beeps, tones, etc.), as but a few examples. The step of generating a sense-able construction action location indicator (15) may, at that point in time when the sense-able construction action location indicator (15) can be sensed (e.g., perhaps after the tool is moved or removed so it does not block visual sighting of the sense-able location indicator (15)), indicate to a laborer the precise location of the building construction action relative to the reference building component (11); the laborer can then perform the appropriate construction action at the correct location. In effect, such inventive technology may transform data (e.g., parameter measurements and the digital construction action location information regarding the location of such building construction action), into a sense-able construction action location indicator (15); such transformation may involve, e.g., transformation of such two data items into an instruction to a sense-able indicator generator to generate that indicator(s) (15) (and use of that instruction by the generation componentry to generate a sense-able indicator at the correct location). Transformation may involve comparison of such data to yield comparison information (e.g., difference between such data), and instructions to generate an indicator based on such comparison information (e.g., when a difference between such (real-time) parameter measurements and such digital construction action location information is sufficiently small, then an instruction may be issued to the generation componentry to generate the indicator).

In certain embodiments, perhaps before such generation, there may be audible (and/or even visual) warning to the laborer to slow or even stop movement of the handheld construction layout tool (5) (during motion away from the zero point) so that such sense-able location indicator (15) can then accurately generated. Such audible warning may, in embodiments, be supplemental to any sense-able location indicator (15), even when such sense-able location indicator (15) is itself audible. The warning serves to instruct the laborer that the construction action location to be sense-ably indicated is nearing, and that the laborer should, if necessary, slow and even stop the movement of the tool so that a sense-able location indicator (15) can be accurately generated. In certain embodiments, a different noise (pitch, noise patter, etc.) or visible lighting may be issued when the tool is at the precisely correct location for accurate placement of the sense-able indicator (perhaps a beeping tone changes to an uninterrupted tone (or vice versa, and/or perhaps with frequency of beeps changing) and/or a row or column of lights fully lights when the tool is at the exact location for precise placement of the sense-able indicator (perhaps analogous to audible (and/or visual) warnings produced by stud-finders). Note that a stud-finder could be incorporated in a tool (and even act to find a zero point to start a measurement).

Figure 2A:
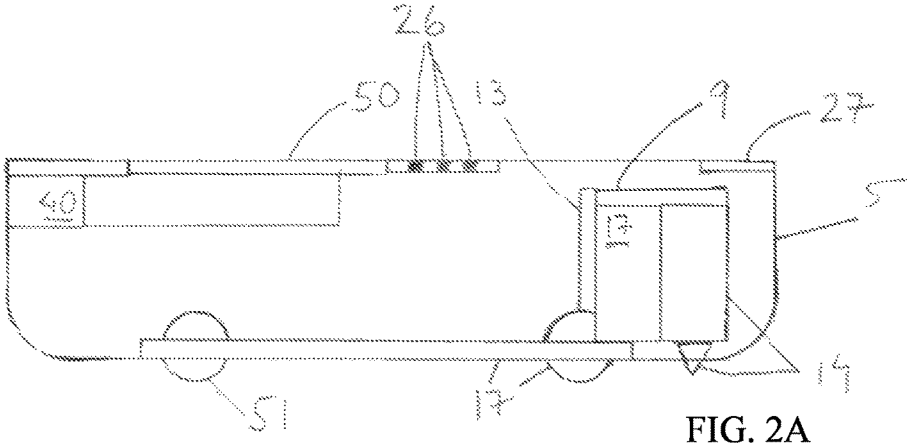
FIG. 2A shows a side view of a construction layout tool as may appear in certain embodiments of the inventive technology.
Figure 2B:
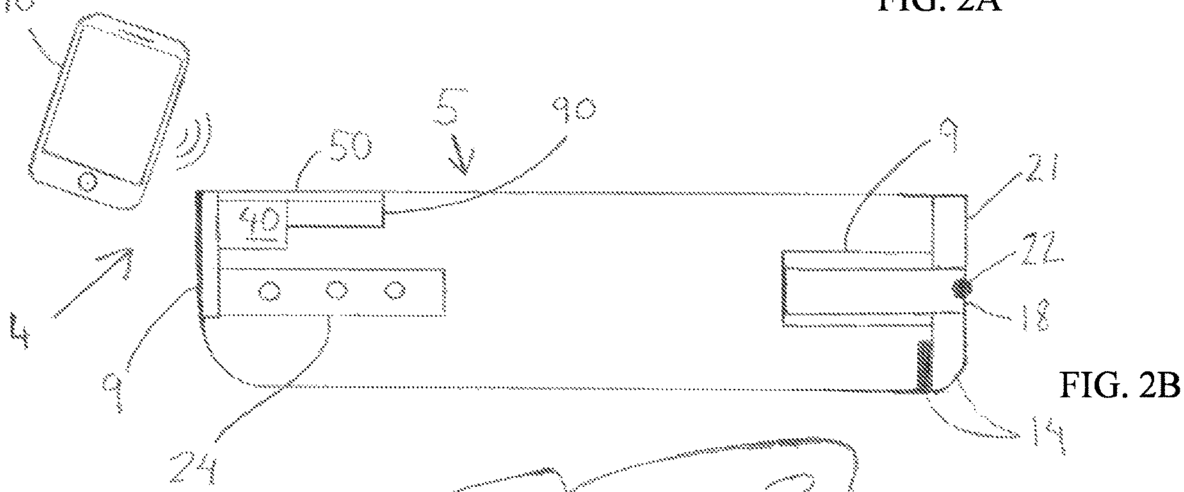
FIG. 2B shows a side view of a construction layout tool in communication with a cell phone as may appear in certain embodiments of the inventive technology.
Figure 2C:
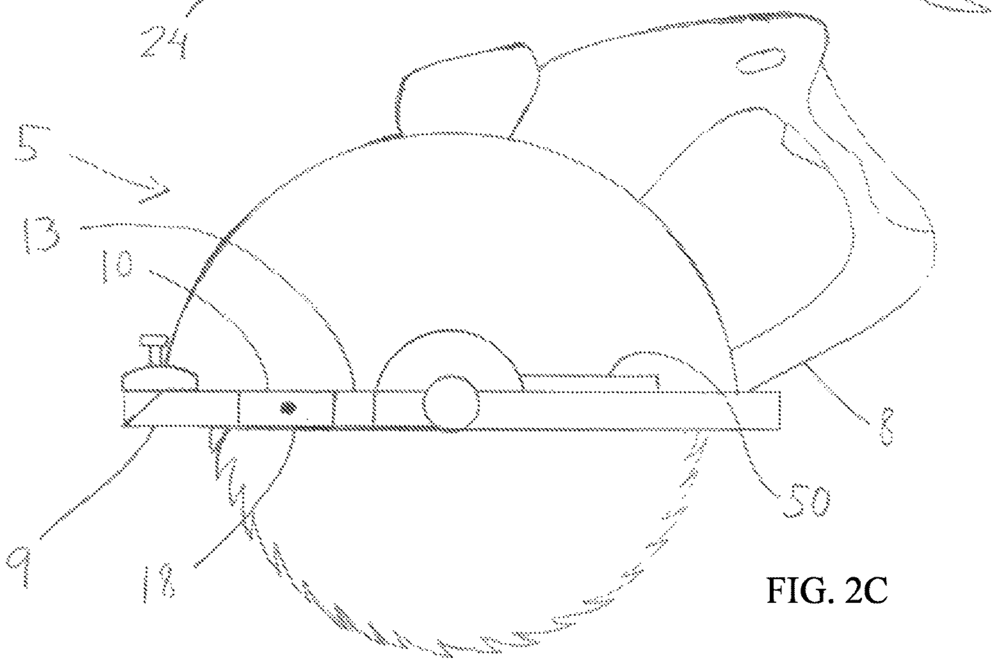
FIG. 2C shows the inventive construction layout technology incorporated in a conventional tool (here, a circular saw) as may appear in certain embodiments of the inventive technology. Note that, for clarity, certain componentry is shown as if any housing of the tool is transparent.

The apparatus may, in certain embodiments, manifest, at least in part, as a discrete tool (e.g., a handheld, construction layout tool (5)) or instead as componentry that is incorporated in, e.g., a conventional, possibly handheld, construction tool (8) (e.g., attached to, or more integrally incorporated in, a construction tool such as a circular saw (as shown in FIG. 2C), a nailer, a drill, etc., to create a new, inventive construction tool adapted to indicate construction action locations). Regardless, it is not the case that all componentry must be on either such handheld tool. Incorporation into a conventional construction tool (8) may even involve retrofitting (e.g., such that components of the apparatus can be retrofit onto the conventional construction tool), or appear in an as-manufactured retail product (such that the construction tool can be purchased with componentry of the apparatus incorporated). Even in the case of incorporation of the inventive technology in a conventional tool, the apparatus, in certain embodiments, may be viewed as a handheld, construction layout tool (5).

Note that, in embodiments that feature such handheld tool or conventional tool with incorporated technology, it is not the case that all componentry of the apparatus must be on such tool. Indeed, certain componentry, e.g., comparison componentry (13), may be on or even off the tool, perhaps in an electronic device (16) that receives parameter measurements in real-time, achieves the comparison, and communicates result(s) (perhaps even only a signal when the sense-able location indicator (15) is to be generated, when a calculated difference between parameter measurement(s) and construction action location information is sufficiently small).

Parameter measurement componentry (10) may include, e.g., roller (including wheel(s) or what are more traditionally viewed as roller(s) (51)) distance measurement componentry using known technology such as but not limited to digital encoder technology, to convert rolled distance into digital information, optical sensor distance measurement componentry, spatial referencing distance measurement componentry, etc.; such information, regardless of the underlying technology generating it (roller, laser, optical sensor, Lidar, sonar, etc.), may, in certain embodiments be displayed on a display (50) (e.g., a screen) of the apparatus, and may be compared to construction action location information. Tools featuring roller distance measurement componentry may simply be manually rolled along a reference component (e.g., a sill plate), starting at, e.g., a zero point (or other location, perhaps entered into the tool), and may generate a sense-able location indicator (15) at the correct location (e.g., at 32", indicate the installed location of the center of an anchor bolt yet to be installed); as mentioned, perhaps as the tool nears the location at which the indicator is to be generated, the tool may issue an audible noise, e.g., tone, beeps and/or voice which would signal to the laborer to slow down and/or stop motion of the tool so that the indicator can be accurately generated. Use of roller-type embodiments may involve, e.g., the manual rolling of a manually manipulable tool (e.g., a handheld tool) along a component (a reference component) that is to be marked for accurate installation of a different component thereon, or manual or mechanical movement of the component through or along a tool. After such generation, the laborer may continue to move the tool, if additional indicators (for other installation locations) are to be generated on that reference component.

Roller distance measurement technology is not the only type of parameter measurement that could be incorporated in the location indication tool. Generally, such componentry could include one or more mechanical roller(s), laser(s) (e.g., of a laser distance measurement device that may include a laser, emission point, receiver, etc.), optical sensor(s), LED sensor(s), position sensing module(s), optical encoder(s), magnetic encoder(s), spatial referencing componentry, other sensors or other distance identifier, whether manual or electronic or other means, to measure distances, and perhaps even angles. Laser distance measurement componentry (18) may feature either or both of the following: (a) a laser distance measurer that is configured to move as the tool moves (due to its attachment to or incorporation in such tool), to form a part of such tool (such that measurements may be made via a laser issued from the tool, to a stationary beam interrupter (21) (e.g., an installed or other component) perhaps serving as a zero point), or (b) componentry that moves with such tool and that is configured to receive measured distance data (either wireless or wired) from a laser distance measurer that is stationarily established, at, e.g., a zero point, and that is configured to interrupt a beam from such laser measurer (perhaps in certain embodiments such beam interrupter (21) is simply a wall of the tool that is closest to the laser measurer). In various embodiments, the apparatus, when featuring a movable handheld tool, may include componentry of (a) above, (b) above or even both (a) and (b). And in either of such three embodiments, the tool may also include roller distance measurement componentry (17). Of course, in certain other embodiments, the parameter measurement componentry (10) may be other than laser-based (e.g., roller-based, as but one example).

Again, as the tool is moved, the distance measured by the parameter measurement componentry (10) changes and may be communicated to comparison componentry (13). Of course, providing laser parameter measurement componentry (10) may be more efficient than, e.g., roller distance measurement componentry (17), because a laser can enable quicker accurate determination of the correct location of the construction action (e.g., obviating the need to perhaps roll the handheld tool along the entire distance from zero point to the correct location).

Examples of a construction layout tool (5) incorporating laser distance measurement componentry (18) include: using type (a), i.e., those that involve a laser distance measurer that is configured to move as the location indication tool is moved, so that one could measure a distance from an installed component acting as a beam interrupter (21) (e.g., a stud) to determine the installation location of yet-to-be installed stud(s); or using type (b), i.e., those that involve a laser distance measurer that is stationarily established and does not move with the movable location indication tool, so that one could measure a distance from the stationarily established laser distance measurer (e.g. from a zero point) to determine the installation location of yet-to-be installed stud(s) in the absence of an installed stud. In the latter, a beam interrupter (21) that moves with the movable (typically handheld) tool may be a type of laser distance measurement componentry (18) (of course, the laser distance measurer may also be laser distance measurement componentry (18)). Either type ((a) or (b)) may be used as part of an apparatus that features a handheld tool (when such tool is dedicated to measuring a parameter and generating an indicator on that parameter, or such handheld tool is a construction tool (e.g., a circular saw) that has incorporated in it parameter measurement componentry (10) and sense-able location indicator generation componentry. Using such technology, one may shoot a distance (e.g., to a certain installed component that interrupts a laser beam), then have the tool mark that distance measured on the material. For example, one may use the tool to shoot a distance of 16 inches (e.g., from a vertical stud along a baseboard, to a location where a neighboring stud is to be installed), then the tool may (perhaps after additional instruction) mark that as you run the tool over the material, as you reach that distance, or even simply allow positioning of the tool such that the cut is at the correct location. Certain embodiments may even simply present laser distance measurement componentry incorporated in a tool, and perhaps calibrated so that its measurement is coordinated to a desired construction action location (e.g., cut location), thereby eliminating the need for any sense-able construction action location indicator generation componentry.

While, in certain embodiments, the construction layout tool (5) is handheld and could be manually run along a reference component by a laborer, in others, the reference component could be manually or mechanically passed through or along the tool (perhaps when the tool is in stationary position, perhaps even not handheld).

As mentioned, the tool could, in certain embodiments, generate (e.g., create and apply) a sense-able, component installation location indicator (15) when it arrives at a construction action location (e.g., left side of a stud to be installed on a sill, cut of a piece of wood to achieve correct length, anchor bolt location, right side of a notch to be cut, as but a few of innumerable examples of construction action locations). The sense-able, component installation location indicator (15) could be, e.g., a visual marking (e.g., a painted line or dot, a burn or melt mark (e.g., a line on wood or plastic), lines, match lines, label, adhered label, adhered sheet material, a tactile marking (an imprint on wood), etc. The sense-able indicator generation componentry could generate markings using, e.g., ink, chalk, carbon black, graphite powder, colored powder, physical indentations or marks, inkjet or laser jet printing, thermal printing, burning, toner, laser, or any other means that would visually or tactilely mark the material with information pertinent to construct or assemble the building element. The tool could incorporate ink cartridges, ink jet componentry, toner cartridges, reservoirs, etc. to hold the marking material. Sense-able indicator generation componentry could, in certain embodiments, feature pressurized containers of marking material that could be valved, and released therefrom via electronically controlled valves, or feature other known marking technology. Possible print technology includes but is not limited to single print cartridge type, multiple print cartridge type (perhaps aligned back to back), Bentsai printers (e.g., B80 handheld inkjet printer, portable HD handheld inkjet printer), drop-on-demand or piezo style inkjet inkjet printer, dot matrix printer, VIAjet V-series printer, handheld printers, or stationary printers.

An audible indicator (e.g., a beep or voice indicator (e.g., "north side of stud 124C is here")) could also or instead be used to indicate location or other information. A combination of indicators (e.g., visual marking and audible) could give information as to the location of a construction action and possibly also other information (e.g., regarding the identity of the component to be installed at such location, installation instructions, code information, etc.), as discussed more below. As mentioned, a warning (e.g., audible) may be issued to advise the laborer to slow or stop movement of the tool so as to allow for proper generation of the location indicator (15). A laborer could sense (e.g., see with his or her eyes, hear and/or tactually sense) such indicator (s)/warning in order to take the appropriate construction action (e.g., installation of a stud, cut of a piece of wood, slow or stop movement of the handheld tool) precisely at the correct location.

Note that an indicator(s) (15) (e.g., visual marking and audible) could be generated by the tool to provide information as to the location of a construction action, and/or other information. Information that is other than the location of a construction action may also be indicated by the apparatus, to a laborer; such other information may include, e.g., identification of the component to be installed onto the reference component, construction action steps for prioritization of the building process, layout/assembly pictures of the framing component for openings, identification of sheathing material to be used and fastener type, size and spacing for the sheathing, match lines for multiple lengths of material, component labeling to aid in assembly (such as "A", "B", "C", "1", "2", "3" or other means of uniquely identifying the components), identity of electrical and plumbing components, instructions on adjusting the angle of the saw blade for angled cuts, type of wire/pipe to be used, outlet required (15 A vs. 20 A for example), quantity list for cutting, specific instructions to the laborer, code information, or any other information to, e.g., aid in, clarify, or facilitate the assembly and construction of the building component. Any of such information could be issued by the apparatus, including the tool itself, whether via screen (e.g., with printed information in English or other language, or with a flow chart, diagram, and/or a bar code or glyph), via a printed label, light projection, marking on the wood, and/or audibly, as but a few examples. Such information could be issued in addition to, or even instead of, information regarding location of a construction action on the reference component.

In certain embodiments, through use of a computer such as a smartphone, tablet, built-in digital display (50), or other device (including the construction layout tool (5) itself), the laborer could, perhaps as a first step in certain embodiments of the inventive technology, select a reference building component (11) onto which at least one other building construction act is to be performed at a certain location relative to the reference building component (11). Such step, showed in exemplary fashion in Step 2 of FIG. 3) may be achieved via, e.g., selecting a component to be installed onto a reference component, selecting the reference component itself (e.g., sill plate on NW side of first floor; E wall on 3$^{rd}$ floor, as but two of many examples). Examples of laborer selection of such building component, which may even be expressed as a construction action, include, e.g., bottom plate on SE wall, install stud no. 4/12 on NW side of first floor at 65" on bottom plate, add 2 oz. of adhesive every 1 foot to a sill, drill hole every 16" on top plate, install concrete anchor every 3' on foundation wall, cut board at 22', joist "34, install anchor bolts into foundation, as but a few of many examples) in order to construct a building. Information associated with the selected component can be communicated to the handheld tool (an implicit step between steps 2 and 3 of FIG. 3). This digital communication (shown as wireless in FIGS. 1A and 2B) could be through hardwire, Bluetooth or other means of wireless or wired digital communication.

Any information, e.g., layout information such as component installation information, code information, distance information, component type information, etc., can be displayed, perhaps even processed where necessary, on a separate digital device such as a smartphone, tablet, or computer, and/or could be displayed on a visual display (50) on the construction layout tool (or the stop block (36) tool described below) itself. The laborer(s), in certain embodiments, could interact with various components of the apparatus to, e.g., select or identify the component being worked on (e.g., bottom plate for stud location), request code requirements/information, request component size/material information, to achieve any benefit(s) offered by embodiments of the inventive technology, such as information regarding location of one or more studs on such particular bottom plate. The laborer could identify standard or default settings or custom settings within digital computing componentry.

Saw Stop Block Apparatus and Method: Of course, in constructing a building, there may be a need for many components (e.g., workpieces) to be cut to length. Examples could include but are not limited to jack studs, trimmers, headers, cripples, sills, rafters, joists, nail blocking, fire walls, etc. Whether via selection of a building element from the digital plan (such as a wall) on any sort of electronic device (16) or otherwise, information regarding pieces to be cut to required lengths so as to render a properly sized component(s) for installation (cut 6×24" pieces from a 12' 2×6) may be displayed or otherwise communicated to a laborer. Once the wall is identified, a cut list can be generated (for example, 2 trimmers at 80 inches, 3 cripples at 16 inches, etc.).

Figure 4A:
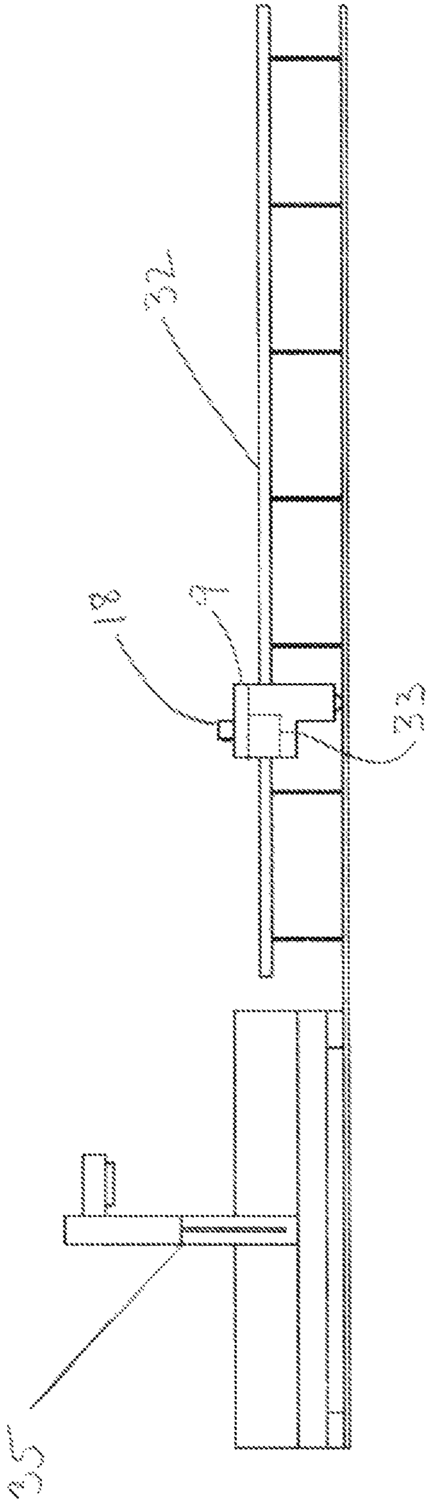
FIG. 4A shows a side view of a stop block apparatus as may appear in certain embodiments of the inventive technology.
Figure 4B:
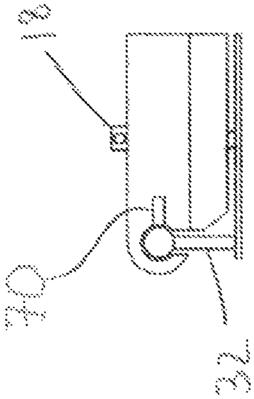
FIG. 4B shows an end view (looking from the cutting device (35)) of the stop block of FIG. 4A. Note that, for clarity, certain componentry is shown as if any housing of the apparatus is transparent.
Figure 5A:
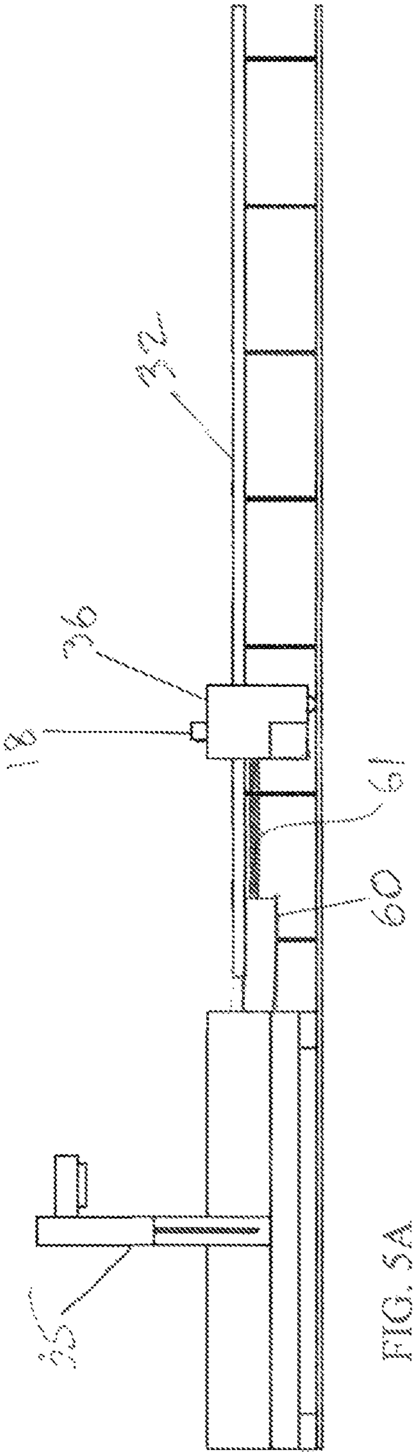
FIG. 5A shows a side view of a stop block apparatus as may appear in certain embodiments of the inventive technology.
Figure 5B:
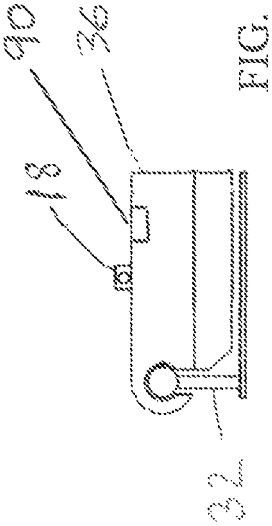
FIG. 5B shows an end view Cooking from the cutting device (35) of the stop block of FIG. 5A. Note that, for clarity, certain componentry is shown as if any housing of the apparatus is transparent.

Relatedly, certain embodiments of the inventive technology may be referred to as an apparatus (e.g., a saw stop block (36) apparatus/tool) that could, in certain embodiments, temporarily or permanently attach to a cutting device (35) such as a miter box, a miter saw, chop saw, radial arm saw, etc., or to a stand or attachment the saw is attached to. It could be capable of receiving data regarding component cut lengths from an external source (perhaps even receiving such data via manual entry), communicating (with communication componentry (9)) data regarding the component cut length, perhaps even in manner similar to that of certain embodiments of the above-described construction layout apparatus (4). Such communication could involve receiving data regarding cut lengths from, e.g., a construction layout apparatus (4), electronic device, or entered manually from the laborer on an electronic controller or display/interface (50) (e.g., keypad) on the apparatus (e.g., on the stop block (36) apparatus). Data regarding such component cut length (e.g., digital data, instructions, etc.) could be communicated to an electro-mechanical, linear translater (33) so such translater can linearly move the component motion obstructer (e.g., stop block (36)) to a position corresponding to the component cut length. Of course, such electro-mechanical, linear translater (33), in order to move to the intended position, may require processing of data, following of instructions, communication of instructions, etc. As used herein, a translater effects translatory motion of the indicated object, device, etc. (here, a component motion obstructer). FIGS. 4 and 5 show various embodiments of the stop block apparatus.

The apparatus, in certain embodiments, may have a component motion obstructer (e.g., stop block (36)), which is any thing, whether block shaped or not, that can stop motion of a board or such) that can "automatically" (e.g., upon receiving data regarding a component cut length) adjust its position (perhaps along a guide (32)) to a position corresponding to the length required for the cut (a component cut length). The component motion obstructer may function by preventing motion in one way (e.g., preventing motion in a direction away from, e.g., a cutting tool) or, in certain embodiments, at least two ways (preventing motion in the direction away from and towards, e.g., a cutting tool, perhaps via a clamp or other securement device). In certain embodiments, upon abutting a component (e.g., a 12' long piece of 2×4 lumber) along a guide (including even just a portion of it) and against a component motion obstructer moved to a position that corresponds to a component cut length, a user can make a cut with the cutting tool so as to produce a piece cut to the component cut length.

An electro-mechanical linear translater (33) could be configured to linearly move the component motion obstructer along a guide (32) (perhaps in either of two directions, such as away from a cutting tool and towards that cutting tool) to a position corresponding to the component cut length (e.g., it may have an end that is connected with a part of the stop block (36) (or a part that is itself connected with the stop block (36))). The electro-mechanical linear translater (33) may be capable of receiving electronic data (e.g., digitally), and acting on it to mechanically translate (move linearly) the component obstructer. The guide (32), e.g., a rail (such as one or two or more tracks that the component motion obstructer rides on, and perhaps even engages) may help to stabilize, guide, orient and/or support, the stop block (36) during its movement. The position corresponding to the component cut length is often the position (of the component motion obstructer) at which the distance between the side of the component motion obstructer nearest to the saw blade, and the side of a saw blade nearest to the component length obstructer, is equal to the component cut length. A position that corresponds to a component cut length is that position that, when a component (e.g., workpiece such as a board) is abutted against a stop block at that position, the cut by the cutting tool (e.g., chop saw) produces a component cut to the intended length.

The linear translater (33) may incorporate, e.g., a linear actuator (60) with extendable/retractable rod (61) (see FIGS. 5A and 5B), rotary screw-type device, electrically driven roller (70) on rail (see FIGS. 4A and 4B), cable-pulley system, etc., as but a few examples, and could be connected with the component obstructer in some fashion (structurally, magnetically, etc.) to move the component obstructer (e.g., stop block (36)) to the correct position for the cut. Using such linear translater (33), the component motion obstructer could be moved to the correct position via instructions to it (perhaps using memory, instructions, data communication, etc., as is known, a computer could determine that movement to a 12'3" position requires 112.65° rotation clockwise) to move (e.g., extend or retract a certain length); such may be done even without the linear translater (33) making measurements (e.g., where memory in the translater correlates length data with, e.g., a number of rotations). However, the linear translater may certainly incorporate distance measurement technology, whether laser or otherwise, and use such measurements to position the stop block at the position corresponding to an intended cut length (which, in manner analogous to the construction layout apparatus, may involve comparisons of real-time measurements with a cut length). Upon abutment of the component to be cut against the properly positioned component motion obstructer, one (or even a robotic or other automated operator) could make one or more cut(s) at the correct, intended component length(s). The component motion obstructer could, in certain embodiments, be rotated up out of the way if a cutting device (e.g., chop saw) needs to be used without the saw stop block (36) apparatus in a lowered position.

In certain embodiments, distance measuring componentry, including known electronic devices such as, e.g., laser distance measuring componentry (18), optical sensor(s), roller distance measurement componentry (17) (e.g., with encoder(s), etc., laser/optical movement technology (as may be found in a computer mouse)) may be incorporated in the apparatus, so that the component motion obstructer is reliably moved to the position corresponding precisely to the component cut length. The distance measurement componentry, whether as part of an electro-mechanical linear translater (33) having the ability to make measurements, or not, can be used to stop the motion, along the guide (32), of the component motion obstructer, when the component motion obstructer is moved to the position corresponding to the component cut length. Laser distance measurement componentry may be deemed more accurate than any measurements potentially made by other measurement devices, and make over-ride such measurements (where there are two types of measurement componentry), in certain embodiments. Where a laser distance measurement componentry is used, a beam interrupter (21) may be established near one end of the apparatus, and the laser (22) at the other. Note that, in certain embodiments, the rail may be stationary relative to the cutting device (whether via attachment thereto or not).

In certain embodiments, the saw stop block apparatus, as with the construction layout apparatus, can feature comparison componentry (13) that compares a parameter measurement with a real-time measurement (e.g., of the stop block from a blade of a saw). In manner analogous to that of certain embodiments of the construction layout apparatus, information resulting from the comparison can be used to stop the translational motion of the stop block at a position corresponding to the component cut length.

The accurately measured distance between, e.g., the obstructer and the cutting tool, e.g., the edge of the sawblade, achieved after the stop block is instructed to move to a position corresponding to a certain cut length, can be used to calibrate the stop block apparatus (for example, if the tool is instructed to move to a position corresponding to a 27³⁄16" cut length, then the distance between the edge of the sawblade and the side of the stop block closest to the saw blade can accurately measured (e.g., with laser distance measurement componentry), compared to that 27³⁄16" value (e.g., via comparison componentry), and if different, then the linear translator can be adjusted as necessary to reflect such measurement. Constant calibration could occur with every cut as the saw blade drops and the tool recalibrates if needed. In a manner that may be analogous to calibration that, in certain embodiments, can take place relative to the construction layout tool, calibration relative to the stop block (36) tool could be achieved by comparing, e.g., a laser measured distance with a distance achieved by the electro-mechanical linear translater (33), and forcing the distance as measured by the translater to be equal to the laser measured distance (in indeed the two are different). As such, the calibration, achieved via calibration componentry (20) could lead to a change of, e.g., the distance instructed to the linear translater to match the reliable electronically measured distance.

A display (50) on the saw stop block (36) apparatus (note that such display could be on the block, or the cutting tool, or even on an electronic device (16), such as a cellphone, that is discrete from the block or cutting tool), could show the quantity required of any given length (e.g., 2 pieces at 6', and one at 14"), and perhaps even what the piece should be labeled as (e.g., "cripple #12"). A means of labeling or marking the piece automatically could also be incorporated in the apparatus. In certain embodiments, instead of digital communication of data from a device to the tool, a laborer could also manually or verbally input the cut length into stop block (36) tool, e.g., into its software, whether program, website or app or digital display (50) of the tool, to have the stop block (36) move to that location, to eliminate the need to measure and mark any length of material.

Note that in certain embodiments, the stop block (36) apparatus may be described as automatic in that it, in response to an instruction communicated to it as to a desired cut length, can, without manual assistance, accurately move the stop block (36) to that position that yields a component cut of the correct length (once the component is laid, perhaps manually, on the rail and abuts that block, and cut). The construction layout apparatus (4) may be termed automatic in that, in certain embodiments, it can generate a sense-able construction action location indicator (15) without manual generation (e.g., without manual striking of a pencil line). In certain applications, the two apparatus, in their various embodiments, may be used together to yield an exceptionally efficient and accurate process: mark reference component (e.g., 18' long 2×6 board), before it is installed, with the construction layout apparatus (4), then cut components (e.g., cut 6 headers at 3' each) using stop block apparatus. Such correctly cut (to proper length) components can then be manually installed at the marked locations.

Any stop block (36) tool features, e.g., the automatically adjustable stop block (36), input of distance data, may also be permanently incorporated in the saw instead of being an attachment thereto. It is of note that, while the saw stop block (36) tool, perhaps together with related technology (e.g., length data generation software), is an inventive technology that is independent of the construction layout apparatus (4), the two technologies can be used together at a single construction project to further improve construction efficiencies. FIG. 3 shows one of many methods involving both apparatus. It is also of note that, in some applications, instead of marking installation locations of components, they could be cut using the saw stop block (36) tool to correct lengths, and those properly dimensioned components could, upon installation in the correct sequence, automatically self-locate at the proper installation location.

Digital voice recognition could be incorporated as communication componentry of the inventive technology (whether construction layout apparatus (4) or stop block (36) apparatus), perhaps into digital computing componentry, e.g., software, and could allow the laborer to direct commands to the system. As an example, a laborer could audibly state "mark cut at forty eight and three quarter inches", and the system could be configured to recognize the command, and instruct the tool to place a cut mark at that length (where such marking occurs perhaps after the tool is rolled from a zero point to the location to be marked), or perhaps (e.g., using laser measuring technology), the tool is moved to a certain location away from a component (e.g., an installed stud or wall) that interrupts a laser beam). Or, with respect to the inventive saw stop block (36) tool technology, "cut length twenty-two and three-eighths inches" and the inventive apparatus would move the stop block (36) to that location. Other commands could include "mark the sill plate for wall number 24", "mark the top plate for wall number 24", "wall 24 is complete", "print a manual note", etc. Capabilities such as Alexa or Google, Siri, Android or any other voice recognition could be utilized in the system.

It is also of note that, in embodiments that employ an electronic device (16) such as but not limited to a cell phone, there may, in certain embodiments, be a means of securing that electronic device to the tool—whether that tool be a layout tool or stop block (36) tool—for easy display and use. Such holder could be, e.g., tablet holders, trays, docking devices, stands, magnets, fasteners, etc. Wireless charging technology may be incorporated in the holder to charge while the device is being used in conjunction with the tool. It is of note that in application using both the construction layout tool (5) and the saw block tool, the construction layout tool (5) may be attached to the saw block tool to aid in the labeling of components, marking, measuring, etc.

As the digital device(s) such as a smart phone, tablet, tool, etc. may be used extensively in any embodiment of the inventive technology, and may include at least some of the inventive technology's digital computing componentry, it may be important to protect the device(s). The laborer would ideally be able to access the device easily, without having to constantly take it out of a pocket, for example. Use could be more efficient if the device(s) were attached to a laborer in some fashion so it isn't left somewhere that would require time to find it, or left in a location that may expose the device to potential damage. The device(s) (e.g., including a tool(s)) could include a protective case that includes a means of attaching a retractable string or chain that could go to a tool bag or belt attachment for example. The attachment could have a clip or magnetic docking location to keep the device safe, but easily accessible. The retractable functionality could reduce potential damage from dropping and aid in re-docking the device properly.

Figure 6:
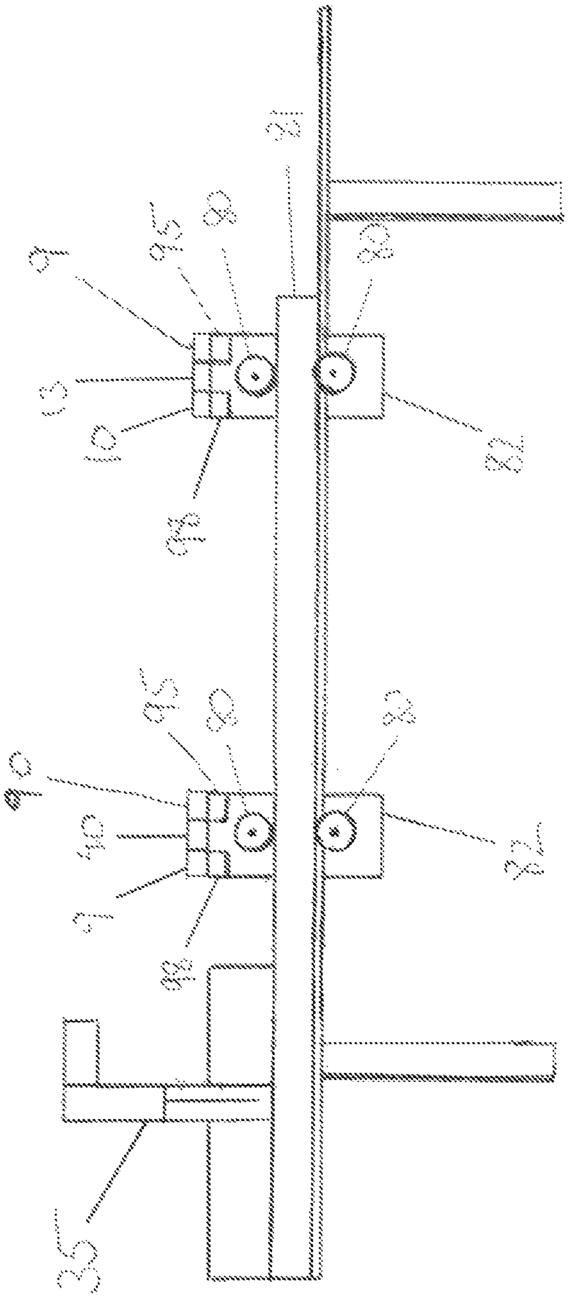
FIG. 6 shows a side view of a controllable roller, automatic workpiece positioning apparatus as may appear in certain embodiments of the inventive technology. Note that, for clarity, certain componentry is shown as if any housing of the apparatus is transparent.

Certain other embodiments may dispense with the need for a stop block and instead employ a roller(s) (80) that move the workpiece (81) to be cut (or more generally, be acted on, e.g., cut, drilled, machined, etc.) until it is in position to be acted on (cut, drilled, etc.). One of such embodiments is shown, in exemplary fashion, in FIG. 6. The roller(s) (in certain embodiments, two or more rollers, perhaps of a roller mechanism (82), may be configured to surround (at least partially, e.g., in a sandwiching fashion), perhaps adjustably, a piece to be acted on, such that rolling motion of the roller(s) causes motion of that piece. The roller mechanism may be computerized (e.g., includes a processor), may be adjustable, may have a drive (95), etc. Motion of the piece can be stopped upon stoppage of rolling motion of the roller(s); for example, rolling can be stopped after that number of rotations (e.g., 148.374) that results in placement of the piece in the correct position (i.e., that position relative to the blade, drill, etc., of the construction tool) that allows for a construction action (e.g., cutting, drilling, etc.) to take place at the desired, intended, correct location). Stoppage of the motion of the piece can be caused via stoppage of the rolling motion of the roller(s) (whether via, e.g., braking by brake (98) or programming), disengagement of the roller(s) with the piece, etc. Aspects of embodiments of this inventive technology may feature technology disclosed above with respect to other inventive apparatus/methods, e.g., communication of digital data, parameter measurement componentry, etc. For example, certain embodiments could feature voice recognition, and automatic repositioning of a piece to be acted on (e.g., sawed, cut, drilled, etc.) via roller rotation, through the use of parameter measurement componentry (laser, roller, Lidar, etc.). Such may be observed as where a piece of lumber, via roller(s), is moved to the position resulting in an accurate cut after comparisons of real time parameter (e.g., length) measurements with a distance corresponding to a correct cut length that is vocally communicated to the apparatus by a laborer.

Note that the terms element and componentry, where used in this disclosure, including its written description and figures, should be understood as referring to one component or structure, or more than one components or structures, whether physically connected or not. Further, this disclosure, where describing feature(s) of the invention in apparatus-oriented terminology, should be understood as also impliedly and inherently disclosing method or process steps relating to function(s) performed by such feature(s) either alone or in combination with other disclosed features, where such function(s) would be apparent to a person having ordinary skill in the art after reviewing this disclosure. Further, one specific componentry (or, e.g., element) can perform not just one, but also, in certain embodiments, two or more different functions or steps, and two or more different steps can even be performed simultaneously. With respect to any use of the term configured, it should be understood to imply, e.g., the connection, assembly, installation, orientation, set-up, establishment, etc., that achieves the indicated function or result.

Relatedly, explicit disclosure of a noun should be understood as implicit disclosure of the verb performed by that noun, and vice versa (for example, explicit disclosure of an "indicator" effectively discloses, implicitly, "indicating"; explicit disclosure of "indicating" effectively discloses, implicitly, an "indicator." The figures in particular should be understood as impliedly and inherently disclosing relative positioning of features/componentry shown, where such relative positioning would be apparent to a person having ordinary skill in the art. Further, technical aspects of the invention that would be known to a person having ordinary skill in the art, having reviewed this disclosure, may not be described in explicit detail in the application as filed to avoid a tedious or prolix writeup. Accordingly, this disclosure should be understood as including such aspects, even where not explicitly disclosed.

This disclosure should be understood as providing a broad supporting description that supports even claims not explicitly appearing in the application as filed. For example, this application should be understood as providing support for the combination of any two or more features, components, parts, structures, or steps where such combination is not explicitly disclosed in the application as filed. Indeed, the application as filed is intended as providing support for any permutations and combinations of any two or more features, components, parts, structures, or steps explicitly disclosed therein. Individual aspects disclosed in the application as filed should be considered as independent inventions even where they are not explicitly indicated as such. Even where only one specific embodiment is disclosed, whether in exemplary fashion or not, in explicit or unspecified support of a broad invention description or claim, such description or claim should not be limited in scope to such specific embodiment. The application filed should also be understood as supporting products produced by explicitly disclosed processes or methods; and processes or methods that manufacture explicitly disclosed apparatus.

Where terms of approximate equality such as "substantially" (e.g., "substantially equal to [reference value]") are used in this disclosure, it should be understood that such terms include values within a closed-ended range of 5% of the indicated reference value, centered on that reference value. For example, "substantially equal to 100° C." would include from and including 97.5° C. to and including 102.5° C. Note that not all uses of the term "substantially" or "substantial" are subject to this definition, as not all such terms are used to suggest sameness in some manner.

Notably, in keeping with the broad disclosure, one component can perform not just one, but also two or more different functions or steps, and two or more different steps can even be performed simultaneously.

Any figures filed as part of this disclosure seek to show the invention or aspects thereof clearly and in uncluttered fashion. Accordingly, it is not necessarily the case that each of the figures of this disclosure shows every single component of the inventive technology or the aspect that it seeks to portray. It is also not necessarily the case that every single component shown on a figure is called out in that figure with a label given to that component in the written description.

Further, to the extent any amendments, characterizations, or other assertions previously made (in this or in any related patent applications or patents, particularly in any parent, but also in any sibling or child application) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, particularly in any parent, but also in any sibling or child application, may need to be re-visited. Accordingly, for example, if a broader claim or claim term is submitted in an application after an assertion (made in a different application) that prior art is different from a prior claim or claim term (of that different application), then, to the extent it might otherwise be construed as a disclaimer of subject matter, such assertion is rescinded and retracted (and such prior art may need to be revisited).

What is claimed is:

1. An apparatus comprising:

communication componentry configured to communicate digital construction action location information regarding a location of a building construction action relative to a reference building component;

parameter measurement componentry configured to generate parameter measurements of said reference building component;

comparison componentry configured to compare said parameter measurements with said digital construction action location information regarding said location of said building construction action relative to said reference building component to generate comparison information;

sense-able construction action location indicator generation componentry configured to generate at least one sense-able construction action location indicator based on said comparison information; and at least one power supply configured to power at least said parameter measurement componentry and said sense-able construction action location indicator generation componentry.

2. The apparatus as described in claim 1 wherein said apparatus further comprises a handheld tool.

3. The apparatus as described in claim 2 wherein said communication componentry comprises componentry established on a handheld tool and componentry established on an electronic device discrete from said handheld tool.

4. The apparatus as described in claim 2 further comprising an audible warning generator configured to advise a laborer to slow movement of said handheld tool.

5. The apparatus as described in claim 1 wherein at least some of said componentry is incorporated in a conventional handheld construction tool.

6. The apparatus as described in claim 5 wherein said communication componentry comprises componentry established on said conventional handheld construction tool and componentry established on an electronic device discrete from said conventional handheld construction tool.

7. The apparatus as described in claim 5 further comprising an audible warning generator configured to advise a laborer to slow movement of said handheld tool.

8. The apparatus as described in claim 1 wherein said parameter measurement componentry comprises componentry selected from the group consisting of: roller distance measurement componentry, laser distance measurement componentry, optical sensor measurement componentry, and spatial referencing distance measurement componentry.

9. The apparatus as described in claim 1 wherein said sense-able construction action location indicator generation componentry comprises componentry configured to generate a visual indicator on said reference building component.

10. The apparatus as described in claim 1 wherein said communication componentry is configured to enable laborer selection of said reference building component on a computer.

11. The apparatus as described in claim 1 further comprising calibration componentry.

12. The apparatus as described in claim 1 wherein said communication componentry is configured to communicate digital construction action location information to a cell phone, from a cell phone, or to and from a cell phone.

13. The apparatus as described in claim 1 wherein said communication componentry is configured to communicate digital construction action location information to a handheld construction layout tool.

14. The apparatus as described in claim 1 wherein said digital construction action location information comprises information regarding a selected said reference building component.

15. A method for assembling at least a portion of a building, comprising:

generating digital construction action location information for a construction project;

selecting, by a laborer on a computer, a reference building component onto which a building construction action is to be performed at a location relative to said reference building component, wherein said digital construction action location information is regarding said location of said building construction action relative to said reference building component;

digitally communicating, to a handheld construction layout tool, said digital construction action location information regarding said location of said building construction action relative to said reference building component;

generating, with parameter measurement componentry, parameter measurements of said reference building component;

generating, with comparison componentry, comparison information by comparing said parameter measurements with said digital construction action location information regarding said location of said building construction action relative to said reference building component;

generating at least one sense-able construction action location indicator with sense-able construction action location indicator generation componentry based on said comparison information, so as to indicate, to said laborer, said location of said building construction action relative to said reference building component; and powering at least said parameter measurement componentry and said sense-able construction action location indicator generation componentry with at least one power supply.

16. The method as described in claim 15 wherein said step of generating digital construction action location information comprises the step of generating digital construction action location information via construction layout software.

17. The method as described in claim 15 wherein at least two of said steps are performed via a laborer's use of said handheld construction layout tool.

18. The method as described in claim 17 wherein said step of selecting, by a laborer on a computer, comprises the step of selecting a reference building component on said handheld construction layout tool.

19. The method as described in claim 17 wherein said step of selecting, by a laborer on a computer, a reference building component, comprises the step of selecting on an electronic device that is discrete from said handheld construction layout tool.

20. The method as described in claim 17 further comprising the step of generating an audible warning advising said laborer to slow movement of said handheld construction layout tool.

21. The method as described in claim 15 wherein at least some of said componentry is incorporated in a conventional handheld construction tool to create a construction tool adapted to indicate construction action locations.

22. The method as described in claim 21 wherein said step of selecting, by a laborer on a computer, a reference building component, comprises the step of selecting on said construction tool adapted to indicate construction action locations.

23. The method as described in claim 21 wherein said step of selecting, by a laborer on a computer, a reference building component, comprises the step of selecting on an electronic device that is discrete from said construction tool adapted to indicate construction action locations.

24. The method as described in claim 15 wherein said step of generating, with parameter measurement componentry, parameter measurements comprises the step of generating at least one parameter measurement via roller distance measurement componentry, optical sensor measurement componentry, spatial referencing distance measurement componentry or laser distance measurement componentry.

25. The method as described in claim 15 further comprising calibrating so said at least one parameter measurement is sufficiently accurate.

* * * * *